(No Model.)
J. A. POWERS & C. M. BALL.
BEARING FOR SHAFTING.
No. 314,475. Patented Mar. 24, 1885.
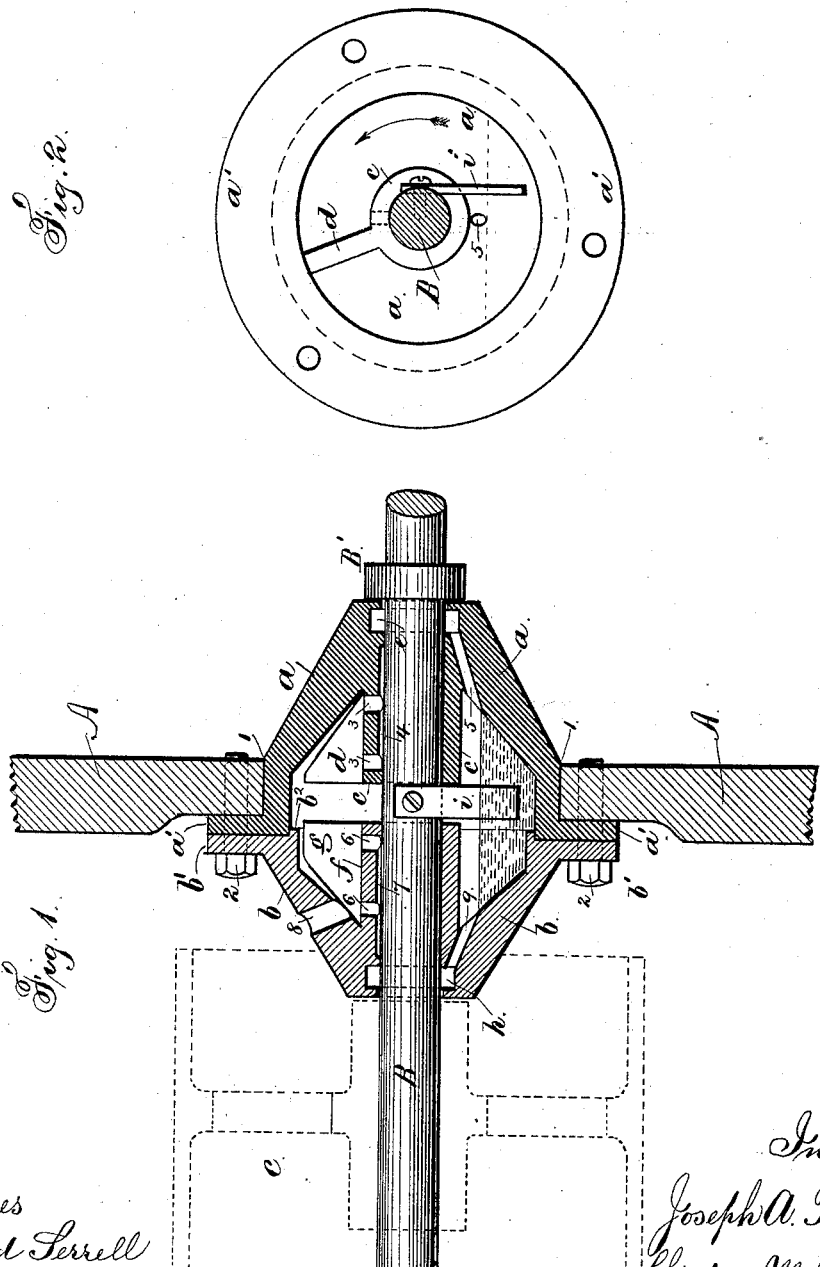

UNITED STATES PATENT OFFICE.

JOSEPH A. POWERS AND CLINTON M. BALL, OF TROY, NEW YORK.

BEARING FOR SHAFTING.

SPECIFICATION forming part of Letters Patent No. 314,475, dated March 24, 1885.

Application filed February 16, 1885. (No model.)

*To all whom it may concern:*

Be it known that we JOSEPH A. POWERS and CLINTON M. BALL, of Troy, in the county of Rensselaer and State of New York, have invented a certain new and useful Improvement in Bearings for Shafting; and the following is declared to be a description of the same.

Our invention relates to bearings for high-speed shafting, notably the shafts of dynamo-electric machines, but is equally applicable to the shafts of any machines where a high speed is required.

The object of our invention is to provide a bearing that is not only accurate and true in its running and of perfect alignment, but one that is so constructed as to insure thorough and copious oiling upon the entire bearing-surface of the shaft passing through it.

Our invention consists of a bearing composed of two shells of conical section fitting one another and adapted to be bolted together and to a frame of suitable form, and having bearing-tubes passing into the central portion, and of a length almost equal to the width of the half-shell, and there is a partition or wall in each shell positioned at an angle of about seventy-five degrees from the horizon, and oil-holes at the base of these partitions through the tubular bearings, and the inner surfaces of the tubular bearings are channeled to connect the oil-holes. There is a space in the bearing-box between the ends of the tubular bearings, and a fin or paddle is secured to and revolves with the shaft, and oil, which is placed in the shell of the bearing, is dipped up by the revolving fin and delivered upon the surface of the partitions and runs down and through the holes in the tubular bearings to oil the shaft. A chamber is formed in the end of each shell to receive surplus oil and return it to the oil-well within the shells.

In the drawings, Figure 1 is a vertical section of the bearing longitudinally of the shaft, and Fig. 2 is an elevation of one of the shells.

A represents a frame of suitable form, B the shaft, and C in dotted lines a pulley. The shell $a$ has a flange, $a'$, and at 1 it is turned to a right angle to fit an opening of corresponding size in the frame A, and it and the shell $b$, by its flange $b'$, are connected together and to the frame by bolts 2. Within the shell $a$ is a bearing-tube, $c$, and a wall or partition, $d$, which partition is at an angle of about seventy-five degrees to the horizon, and there are oil-holes 3 through the tube $c$, and a channel, 4, cut on the inside of the tube above the shaft. A chamber is provided at $e$, to receive surplus oil and return it to the oil-well within the shells by the hole 5. The shell $b$ has a flange, $b'$, and inner flange or rib, $b^2$, and by this inner flange is made to accurately fit the shell $a$. Within this shell $b$ there is a bearing-tube, $f$, a partition or wall, $g$, oil-holes through tube $f$ at 6, a channel at 7, and a hole at 8 for supplying oil into the shells from without. There is a chamber at $h$ to receive surplus oil at the opposite end of the bearing and return it to the oil-well within the shells by the oil-hole 9. The partitions $d\ g$ are facing one another and at about the same angle.

Upon the shaft B there is a collar, B', which, with the pulley C, steadies the shaft in its bearings, and to the shaft B there is a fin or paddle, $i$, secured upon a flattened portion. This fin or paddle may be of any desired material, and it revolves with the shaft in the direction of the arrow, and in its revolution dips into the oil in the lower parts of the shells $a\ b$, carrying up at each revolution a small quantity of oil, which is thrown against the partitions $d\ g$, and, running down, passes through the holes 3 and 6 upon the shaft B and maintains a continuous supply in the channels 4 and 7. The surplus oil accumulated in the chambers $e$ and $h$ passes by holes 5 and 9 and is returned within the shells to the main body of oil, and thus a steady flow of oil is constantly kept up and the shaft copiously lubricated.

We claim as our invention—

1. The bearing for shafting, composed of the hollow shells $a\ b$, having uniting-flanges $a'\ b'\ b^2$, internal bearing-tubes, $c\ f$, partitions $d\ g$, the oil-holes, channels, and chambers, in combination with a frame, A, and bolts 2, the shaft B, and a fin or paddle, $i$, upon the same, substantially as and for the purposes set forth.

2. In a bearing for shafting, the combination, with the shaft B and fin or paddle $i$ upon the same, and a support for the bearing, of the hollow bearing-shells $a\,b$, the bearing-tubes $c\,f$, the inclined partitions $d\,g$, and openings for introducing oil within the shells, for conveying oil to the shaft, and for returning the oil back to the oil-well, as and for the purposes set forth.

Signed by us this 10th day of February, A. D. 1885.

J. A. POWERS.
CLINTON M. BALL.

Witnesses:
C. H. TOTHURST,
A. G. GOLDTHWAITE.